UNITED STATES PATENT OFFICE 2,462,390

METHOD OF PREPARING AQUEOUS EMULSIONS OF POLYETHYLENE

Jesse Harmon, Wilmington, Del., assignor to E. I. du Pont de Nemours & Company, Wilmington, Del., a corporation of Delaware No Drawing. Application June 10, 1946, Serial No. 675,833. In Great Britain April 25, 1946

4 Claims. (Cl. 260—29.6)

This invention relates to the polymerization of ethylene in aqueous media. More particularly, it relates to stable aqueous dispersions of ethylene polymers and to a method of obtaining such dispersions directly from monomeric ethylene.

It is known that ethylene can be converted to high molecular weight polymers and interpolymers by subjecting it to elevated temperatures and pressures in the presence of oxygen-giving catalysts. It is known further that the polymerization can be carried out in aqueous media containing as the catalyst a small amount, up to 1% based on the water, of an alkali persulfate. This and other polymerization processes, however, do not yield an aqueous dispersion of the polymer but yield the ethylene polymer as a solid or semisolid material having no ability to disperse in water. In order to prepare aqueous suspensions of ethylene polymers, which are of great industrial importance in many applications, such as coating and impregnating, it is necessary to subject the preformed ethylene polymer to special treatments, such as that described in U. S. Patent 2,290,794.

This invention has as an object an improved aqueous dispersion of ethylene polymer characterized by extremely high suspension stability. Another object is a method of preparing such dispersions directly from ethylene. Other objects will appear as the description proceeds.

These objects are accomplished by subjecting ethylene to elevated temperatures and pressures of at least 200 but not substantially greater than 1000 atmospheres in intimate contact with an aqueous solution of an alkali persulfate containing from 3% to about 20%, based upon the water, of alkali persulfate and having an initial pH between 7.5 and 11.0, until absorption of ethylene substantially ceases. The product of this process is an aqeuous dispersion of high molecular weight ethylene polymer, stabilized by a surface-active agent formed in situ at the same time during the polymerization.

The surface-active agent responsible for the remarkable stability of the suspensions of this invention is believed to be a low molecular weight ethylene polymer, having perhaps from 3 to 30 recurring ethylene (—CH$_2$CH$_2$—) units, the chain being terminated, at least at one end, by a hydrophilic group of the type —O—SO$_3$Na provided by the alkali persulfate present.

The invention will be more clearly understood by reference to the following example wherein parts are by weight.

EXAMPLE

A solution of 15 parts of sodium persulfate and 10 parts of borax in 150 parts of water, which solution has an initial pH of about 9.0, is placed in a stainless steel lined oscillating autoclave of capacity about twice the volume of its contents, the autoclave being connected with a source of ethylene at high pressure. The autoclave is closed, agitation is started and the temperature is raised while ethylene is introduced into the vessel, maintaining a pressure of about 400 atmospheres. Reaction sets in at about 75° C. and the heat of reaction brings the temperature up to 138° C. for about one-half hour, after which the reaction is continued at about 75° C. for 10½ hours, when the absorption of ethylene substantially ceases. The ethylene pressure is maintained within the range 340-550 atms. throughout. The resulting product is an aqueous dispersion (pH 7.9, total polymer content about 75 parts) of high molecular weight ethylene polymer. This dispersion is extraordinarily stable. It cannot be broken by ordinary means and shows no signs of settling after over a year's storage. A convenient way of separating the solid polymer from the aqueous phase is by hydrolytic destruction of the dispersing agent, as is described below.

Other polymerization experiments leading to highly stable polymer dispersions are summarized in the following table. The general polymerization procedure was similar to that described above.

Ethylene polymerization

| Run | Composition of Aqueous Solution | Reaction time | Temperature | Pressure | Polymer Content of Dispersion (Estimated) |
|---|---|---|---|---|---|
| | | Hrs. | °C. | Atm. | Parts |
| 2 | Water, 150 parts; Sodium persulfate 5 parts; Borax, 5 parts | 10¾ | 77-91 | 300-600 | 135 |
| 3 | Water, 150 parts; Sodium persulfate, 15 parts; Sodium carbonate, 10 parts | 10¼ | 72-90 | 545-750 | 80 |
| 4 | Water, 170 parts; Sodium persulfate, 30 parts; Borax, 15 parts | 2¼ | 78-86 | 264-400 | 70 |

Investigation of the nature of the polymer obtainable by the described process is best carried out through hydrolysis experiments. When the polymer dispersion of the example, as discharged from the reactor, is diluted with three times its volume of water and heated with 100 parts of 10% sulfuric acid at 100° C. for at least 12 hours, it breaks to give a solid precipitate. After thorough washing with water and drying, this material (72 parts) is subjected to continuous extraction with ethanol, whereupon it is divided into two portions:

A. An alcohol-insoluble portion (66 parts) which contains 81.72% of carbon and 13.67% of hydrogen. This product is a white amorphous powder which can be pressed between hot platens to give tough and flexible films. Analysis and physical properties indicate that this portion is essentially a high molecular weight ethylene polymer with a small proportion of oxygen-containing groups, presumably formed by hydrolysis of the —O—SO$_3$Na groups which are believed to be present in the polymer in small amounts.

B. An alcohol-soluble portion (6 parts) obtained by evaporating the solvent to dryness. This is a grease-like product containing 64.05% carbon, 11.73% hydrogen, 3.99% sulfur, and (by difference) 20.23% oxygen. The analytical data and hydroxyl number (133.1) indicate that the product is chiefly a glycol, of molecular weight about 800, apparently derived from the hydrolysis of a low molecular weight ethylene polymer having —O—SO$_3$Na end-groups. This low molecular weight, modified ethylene polymer is evidently the surface-active agent responsible for the extraordinary stability of the suspension of high molecular weight ethylene polymer. This product can be freed from sulfur compounds by dissolving it in ether and washing the solution with 20% aqueous potassium hydroxide or potassium carbonate solution.

The aqueous filtrate resulting from the sulfuric acid hydrolysis may be evaporated to dryness and the residue extracted with butanol to give a very minute amount of a viscous oil containing 65.10% carbon, 10.70% hydrogen, no sulfur and 24.20% oxygen (by difference). It has a molecular weight of 241 and the analytical data indicate it is a glycol of 14–20 carbon atoms.

In the process of this invention, it is essential that the alkali persulfate be present in amounts between 3% and about 20%, based on the water. With lower amounts, an aqueous polymer suspension is not obtained (the product is a solid material easily separable from the aqueous phase). With higher amounts, the yield in polymer is very poor and again no suspension is obtained. Preferably, there is used between about 5% and about 15% of alkali persulfate, based on the water. Sodium persulfate is the preferred agent, but potassium and lithium persulfates are also suitable.

The initial pH of the aqueous solution should be between about 7.5 and about 11.0 and preferably between 8.5 and 10, to obtain satisfactory results in the process of this invention. The pH is readily adjusted to the desired range by addition in sufficient quantity of any known buffer such as borax, sodium or potassium carbonate or bicarbonate, trisodium phosphate and the like.

The reaction is preferably carried out in water alone as the menstruum. The polymerizable material used in the practice of this invention consists wholly of ethylene, but if desired, minor amounts of unpolymerizable organic liquids such as methanol, ethanol, isooctane, cyclohexane, ethyl ether, etc., may be added.

The ethylene pressure applied should be of the order of at least 200 atmospheres, and preferably above 300 atmospheres. It can be as high as 1000 atmospheres, but pressures above about 1000 atmospheres tend to give unstable dispersions. The preferred pressure range is 300 to 600 atmospheres. The polymerization reaction usually starts spontaneously at a temperature of about 65–70° C., and the reaction is suitably carried out within the temperature range of 65–200° C., preferably 70–150° C.

The polymer dispersion obtainable in accordance with this invention can be used as such, or after suitable dilution with water, in many applications such as impregnation of fabrics for box-toes, pigment coating, impregnation of regenerated cellulose fibers or films, textile coating, binding of plastic surfaces, etc. If desired, the dispersions can be evaporated or coagulated and the high molecular weight ethylene polymer can be extracted with suitable organic solvents for subsequent use in applications not requiring aqueous dispersions.

As many apparently widely different embodiments of this invention may be made without departing from the spirit and scope thereof, it is to be understood that I do not limit myself to the specific embodiments thereof except as defined in the appended claims.

I claim:

1. A process for polymerizing ethylene in aqueous medium and directly obtaining the resulting ethylene polymer in the form of a stable dispersion in the aqueous medium, said process comprising subjecting ethylene as the sole polymerizable constituent to polymerizing temperature and a pressure of from 200 to 1000 atmospheres in intimate contact with a buffered aqueous solution of an alkali persulfate having a pH between 7.5 and 11 and containing from 3% to 20%, based on the weight of the water present, of said persulfate, and continuing the reaction until absorption of the ethylene substantially ceases, the aqueous dispersion directly obtained by said process containing as the sole agent effecting the stabilization of said dispersion the surface active agent formed in situ during polymerization of the ethylene in contact with said aqueous solution of persulfate.

2. The process set forth in claim 1 in which said alkali persulfate is sodium persulfate.

3. A process for polymerizing ethylene in aqueous medium and directly obtaining the resulting ethylene polymer in the form of a stable dispersion in the aqueous medium, said process comprising subjecting ethylene as the sole polymerizable constituent to polymerizing temperature and a pressure of from 300 to 600 atmospheres in intimate contact with a buffered aqueous solution of an alkali persulfate having a pH between 8.5 and 10 and containing from 5% to 15%, based on the weight of the water present, of said persulfate, and continuing the reaction until absorption of the ethylene substantially ceases, the aqueous dispersion directly obtained by said process containing as the sole agent effecting the stabilization of said dispersion the surface active agent formed in situ during polymerization of the ethylene in contact with said aqueous solution of persulfate.

4. The process set forth in claim 3 in which said alkali persulfate is sodium persulfate.

JESSE HARMON.

(References on following page)

REFERENCES CITED

The following references are of record in the file of this patent:

UNITED STATES PATENTS

| Number | Name | Date |
|---|---|---|
| 2,290,794 | Alvarado | July 21, 1942 |
| 2,342,400 | Hopff | Feb. 22, 1944 |
| 2,388,225 | Brooks | Oct. 30, 1945 |

OTHER REFERENCES

Kline: "Emulsion Polymerization of Ethylene," Modern Plastics, pages 153–60, 206, 208, 210, 212, 214, 216, 218, and 220, June 1946, especially 156–60.